(12) United States Patent
Tomita et al.

(10) Patent No.: US 9,293,960 B2
(45) Date of Patent: Mar. 22, 2016

(54) ELECTRICAL COLLECTING AND DISTRIBUTING RING

(71) Applicant: Hitachi Metals, Ltd., Tokyo (JP)

(72) Inventors: Kazuhiko Tomita, Mito (JP); Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/260,832

(22) Filed: Apr. 24, 2014

(65) Prior Publication Data

US 2014/0319944 A1    Oct. 30, 2014

(30) Foreign Application Priority Data

Apr. 25, 2013    (JP) .................................. 2013-092493

(51) Int. Cl.
*H02K 3/52*    (2006.01)
*H02K 3/12*    (2006.01)
*H02K 3/28*    (2006.01)

(52) U.S. Cl.
CPC ............... *H02K 3/522* (2013.01); *H02K 3/12* (2013.01); *H02K 3/28* (2013.01); *H02K 2203/09* (2013.01)

(58) Field of Classification Search
CPC ........ H02K 3/28; H02K 3/12; H02K 2203/09
USPC ........................................................ 310/71
See application file for complete search history.

(56) References Cited

U.S. PATENT DOCUMENTS

| | | | |
|---|---|---|---|
| 6,930,434 B1* | 8/2005 | Spencer et al. | 310/270 |
| 2009/0256439 A1* | 10/2009 | Inoue et al. | 310/71 |
| 2012/0112580 A1* | 5/2012 | Sato et al. | 310/71 |

FOREIGN PATENT DOCUMENTS

JP    2008-109718    5/2008

* cited by examiner

*Primary Examiner* — Terrance Kenerly
(74) *Attorney, Agent, or Firm* — Roberts Mlotkowski Safran & Cole, PC

(57) ABSTRACT

An electrical collecting and distributing ring is composed of an annular bus ring including a plurality of terminals and a plurality of circular arc portions therebetween, respectively, and a holding member, which at least partially molds the bus ring. The plurality of terminals include respective one pair of extended portions formed with clamping portions, respectively, extending through the holding member and in a radial direction of the circular arc portions to clamp an end therebetween of a winding. The respective one pair of extended portions of the terminals include thin portions, respectively, formed thin in thickness in a circumferential direction of the circular arc portions, at least partially between the holding member and the clamping portions, respectively. The terminals and the ends of the winding are connected together by caulking the clamping portions with the ends of the winding clamped between the clamping portions, respectively.

4 Claims, 6 Drawing Sheets

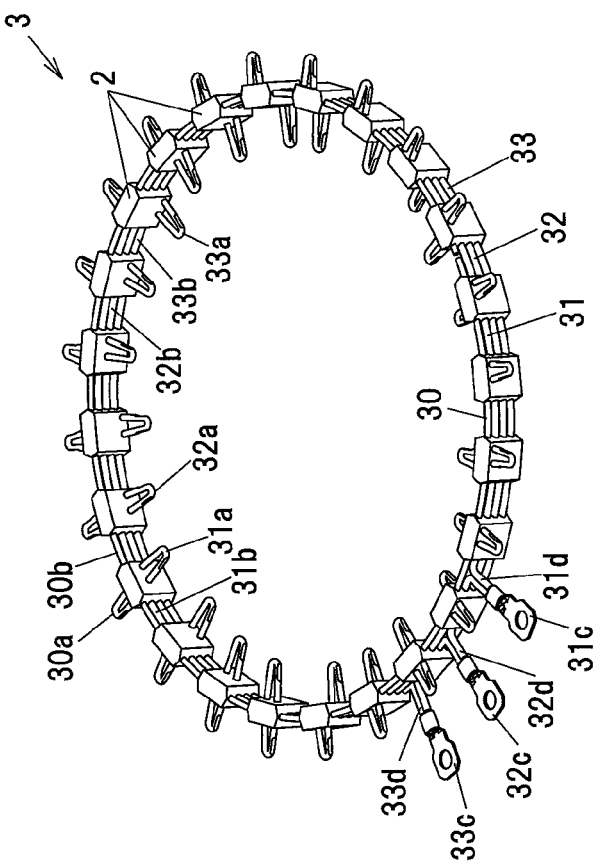
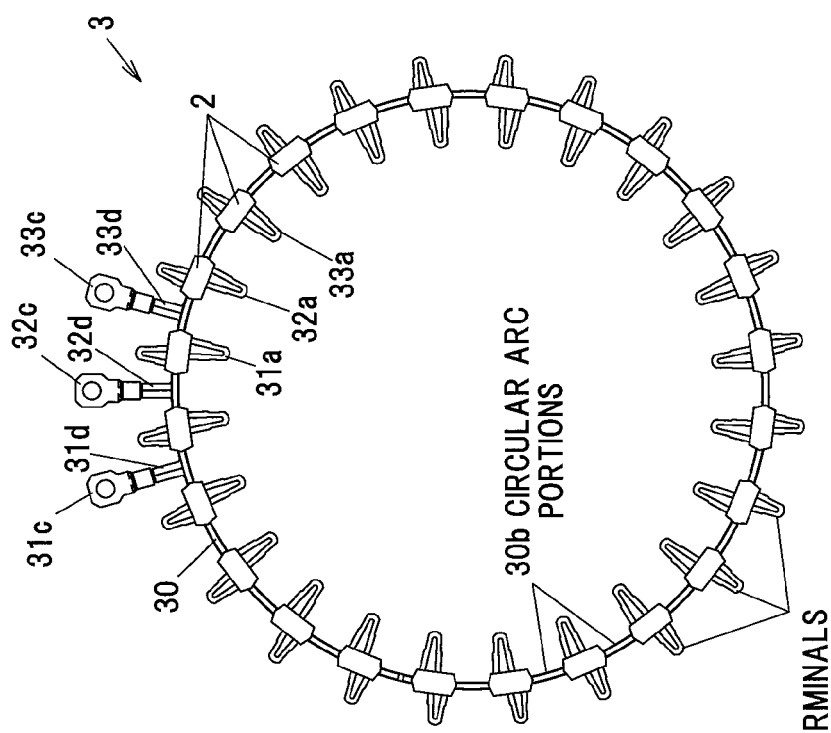

ELECTRICAL COLLECTING AND DISTRIBUTING RING

The present application is based on Japanese patent application No. 2013-092493 filed on Apr. 25, 2013, the entire contents of which are incorporated herein by reference.

BACKGROUND OF THE INVENTION

1. Field of the Invention

This invention relates to an electrical collecting and distributing ring, which performs electrical collection and distribution to a winding wound around a plurality of teeth.

2. Description of the Related Art

Conventionally, an electrical collecting and distributing ring is known that is used in a motor, to provide an electric current from an inverter to a winding wound around a plurality of annularly arranged teeth (Refer to e.g. JP-A-2008-109718).

The electrical collecting and distributing ring (electrical collecting and distributing part) disclosed in JP-A-2008-109718 comprises a plurality of annular electrical conductors, a plurality of holding members, which integrally resin mold the plurality of annular electrical conductors, and a plurality of connecting terminals, which are electrically connected to the plurality of annular electrical conductors, respectively. These connecting terminals integrally include a respective annular electrical conductor connecting portion, which is connected to the annular electrical conductor, respective one pair of coil connecting portions, which are connected to an end of a coil of a motor, and a respective coupling portion, which couples the respective annular electrical conductor connecting portion and the respective one pair of coil connecting portions together.

The annular electrical conductor connecting portions are arranged within the holding members, respectively, equally spaced in a circumferential direction of the annular electrical conductors, and the respective one pair of coil connecting portions are exposed inward in a radial direction of the annular electrical conductors, and are arranged parallel to each other to clamp the end of the coil therebetween. The one pair of coil connecting portions and the end of the coil are connected together by welding while applying pressure to the one pair of coil connecting portions so as to bring the one pair of coil connecting portions into contact with the end of the coil.

SUMMARY OF THE INVENTION

The electrical collecting and distributing ring disclosed in JP-A-2008-109718 has led to an increase in the number of parts due to the annular electrical conductors and the connecting terminals being composed of different members. Accordingly, the Inventors have had the idea of bending a linear electrical conducting member as shown in FIGS. 6A and 6B to thereby form the annular electrical conductors and the connecting terminals, to reduce the number of parts for the electrical collecting and distributing ring.

When the one pair of coil connecting portions and the end of the coil have been connected together, the application of pressure to the one pair of coil connecting portions so as to bring them into contact with the end of the coil has however caused stress to act between the holding members and the coil connecting portions exposed from the holding members, and damaged the connecting terminals.

Thus, it is an object of the present invention to provide an the electrical collecting and distributing ring, which is capable of mitigating stress acting between a holding member and a connecting terminal exposed from the holding member.

According to an embodiment of the invention, an electrical collecting and distributing ring comprises:

an annular bus ring for performing electrical collection and distribution to a polyphase winding wound around a plurality of annularly arranged teeth, the bus ring including a plurality of terminals and a plurality of circular arc portions therebetween, respectively, formed by bending a linear electrical conducting member, so that the plurality of terminals are connected to ends, respectively, of the winding, while being connected together in a circumferential direction by the plurality of circular arc portions therebetween, respectively; and a holding member, which at least partially molds the bus ring, wherein the plurality of terminals include respective one pair of extended portions formed with clamping portions, respectively, extending through the holding member and in a radial direction of the circular arc portions to clamp the end therebetween of the winding, wherein the respective one pair of extended portions of the terminals include thin portions, respectively, formed thin in thickness in the circumferential direction of the circular arc portions, at least partially between the holding member and the clamping portions, respectively, wherein the terminals and the ends of the winding are connected together by caulking the clamping portions with the ends of the winding clamped between the clamping portions, respectively.

In the embodiment, the following modifications and changes may be made.

(i) The thin portions are formed by flattening the electrical conducting member in the circumferential direction of the circular arc portions.

(ii) The respective one pair of extended portions of the terminals and the end therebetween of the winding are connected together by heat caulking.

(Points of the Invention)

The electrical collecting and distributing ring according to the present invention allows for mitigating stress acting between the holding member and the connecting terminals exposed from the holding member.

BRIEF DESCRIPTION OF THE DRAWINGS

The preferred embodiments according to the invention will be explained below referring to the drawings, wherein:

FIG. 2A is a front view showing the electrical collecting and distributing ring viewed in an axial direction of the electrical collecting and distributing ring;

FIG. 2B is a perspective view showing the electrical collecting and distributing ring;

DETAILED DESCRIPTION OF THE PREFERRED EMBODIMENTS

Figure 1:
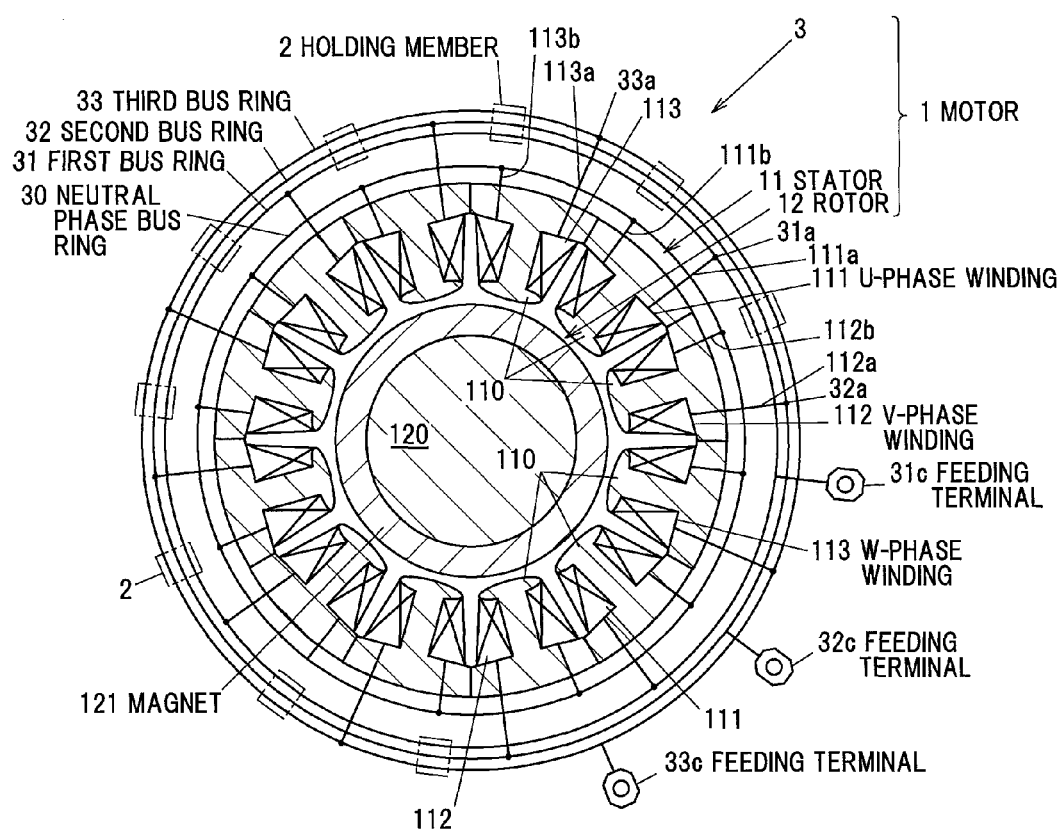
FIG. 1 is a schematic diagram showing a schematic configuration example of an electric motor having an electrical collecting and distributing ring in an embodiment according to the invention.

FIG. 1 is a schematic diagram showing a schematic configuration example of an electric motor 1 having an electrical collecting and distributing ring in an embodiment according to the invention.

(Configuration of the Motor 1)

This motor 1 comprises a stator 11, which is a stationary part, a rotor 12, which is a rotating part, and an electrical collecting and distributing ring 3, which distributes a driving current to the stator 11.

The stator 11 is made of a magnetic material, and comprises polyphase windings 111, 112 and 113 wound around a plurality of annularly arranged teeth 110. Each tooth 110 is wound with a U phase winding 111, a V phase winding 112 or a W phase winding 113 therearound. The U phase winding 111, the V phase winding 112 and the W phase winding 113 are, in turn, arranged in a circumferential direction (clockwise direction in FIG. 1) of the stator 11.

One end of the U phase winding 111 is configured as a first lead wire 111a, while the other end of the U phase winding 111 is configured as a second lead wire 111b. Likewise, one end of the V phase winding 112 is configured as a first lead wire 112a, while the other end of the V phase winding 112 is configured as a second lead wire 112b. Also, one end of the W phase winding 113 is configured as a first lead wire 113a, while the other end of the W phase winding 113 is configured as a second lead wire 113b.

The rotor 12 includes a shaft 120, which is supported pivotally and coaxially with the stator 11 by a bearing not shown, and a magnet 121 having a plurality of magnetic poles, which are fixed around an outer surface of the shaft 120.

The electric collecting and distributing ring 3 comprises first, second and third bus rings 31, 32 and 33 and a neutral phase bus ring 30, and a plurality of holding members 2. The first, second and third bus rings 31, 32 and 33 distribute a driving current output from an inverter not shown, through the feeding terminals 31c, 32c and 33c, to the U, V and W phase windings 111, 112 and 113, respectively. The first, second and third bus rings 31, 32 and 33 and the neutral phase bus ring 30 are arranged concentrically with the stator 11 and are held together by the holding members 2 arranged at a plurality of locations respectively in a circumferential direction of the first, second and third bus rings 31, 32 and 33 and the neutral phase bus ring 30.

The first bus ring 31 is connected with the first lead wire 111a of the U phase winding 111. The second bus ring 32 is connected with the first lead wire 112a of the V phase winding 112. The third bus ring 33 is connected with the first lead wire 113a of the W phase winding 113. Also, the neutral phase bus ring 30 is connected with the second lead wire 111b of the U phase winding 111, the second lead wire 112b of the V phase winding 112, and the second lead wire 113b of the W phase winding 113.

The U phase winding 111, the V phase winding 112 and the W phase winding 113 are provided with sine wave driving currents, respectively, each being 120 degrees out of phase from the others, from the inverter not shown, to produce a rotating magnetic field in the stator 11. The magnet 121 is acted on by a rotational force resulting from attractive and repulsive forces due to the rotating magnetic field, and this rotational force results in a rotation of the shaft 120.

(Configuration of the Electrical Collecting and Distributing Ring 3)

Figure 3:
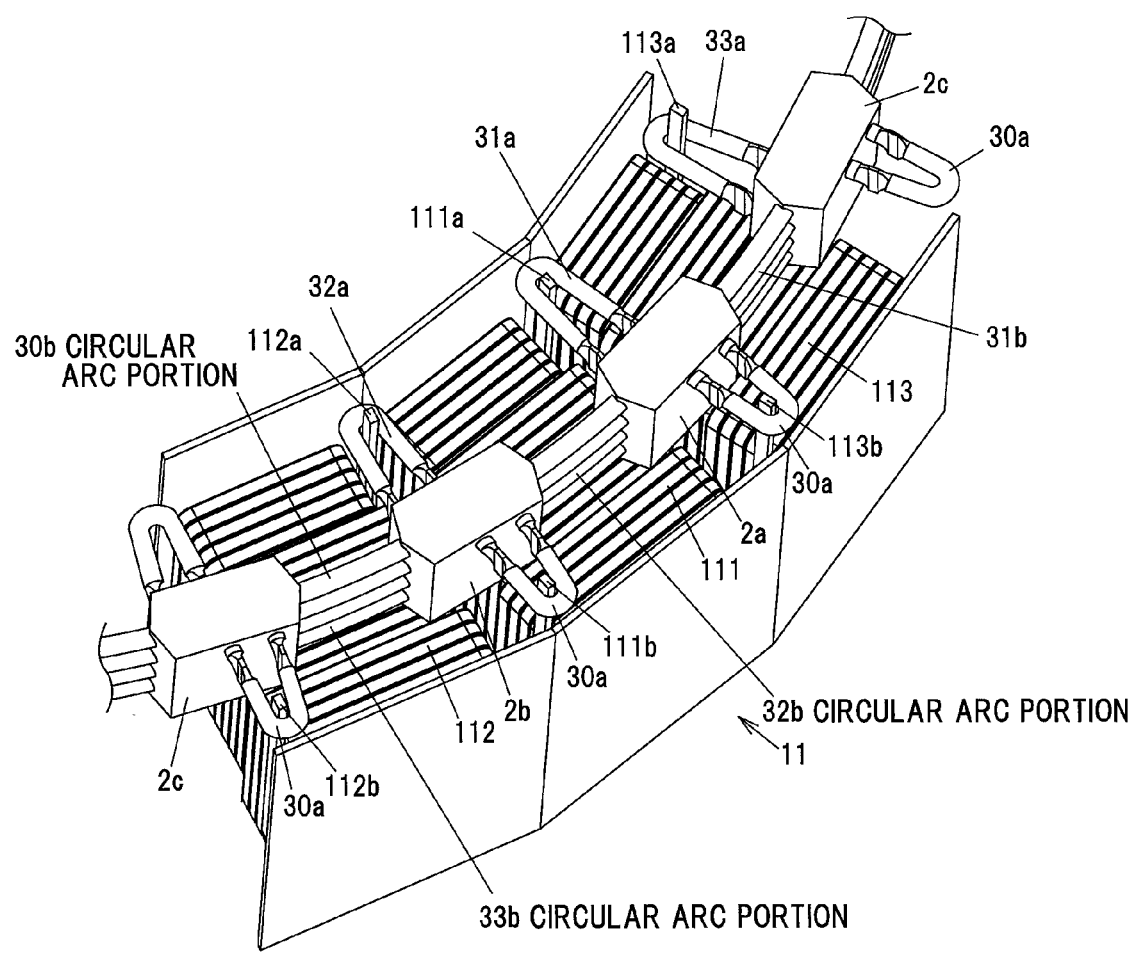
FIG. 3 is a partially enlarged view showing one example of a structure for connections between the electrical collecting and distributing ring and lead wires.

FIG. 2A is a front view showing the electrical power collecting and distributing ring 3 viewed in an axial direction of the electrical power collecting and distributing ring 3. FIG. 2B is a perspective view showing the electrical power collecting and distributing ring 3. FIG. 3 is a partially enlarged view showing one example of a structure for connections between the electrical power collecting and distributing ring 3 and respective lead wires of the U, V and W phase windings 111, 112 and 113.

The first, second and third bus rings 31, 32 and 33 and the neutral phase bus ring 30 are formed in a ring shape and arranged on top of and parallel to each other in an axial direction of the electrical collecting and distributing ring 3, and are fixed to each other by the plurality of holding members 2 made of a molded resin. In this embodiment, in FIG. 2B, there are arranged, in turn, from top in the axial direction of the electrical collecting and distributing ring 3, the neutral phase bus ring 30, the first bus ring 31, the second bus ring 32 and the third bus ring 33.

The first bus ring 31 is formed with a plurality of terminals 31a, which are arranged at a plurality of locations respectively in the circumferential direction of the first bus ring 31 so as to be connected to the end (first lead wire 111a) of the U phase winding 111, and a plurality of circular arc portions 31b, which connect the plurality of terminals 31a together in the circumferential direction of the first bus ring 31. In this embodiment, the terminals 31a each extend through the holding members 2, respectively, and inward in a radial direction of the circular arc portions 31b.

Also, at an end 31d of the first bus ring 31, a feeding terminal 31c, which is provided with a U phase driving current flowing in the first bus ring 31, is thermally caulked, and projected outward in a radial direction of the electrical collecting and distributing ring 3.

The second bus ring 32 is formed with a plurality of terminals 32a, which are arranged at a plurality of locations respectively in the circumferential direction of the second bus ring 32 so as to be connected to the end (first lead wire 112a) of the V phase winding 112, and a plurality of circular arc portions 32b, which connect the plurality of terminals 32a together in the circumferential direction of the second bus ring 32. In this embodiment, the terminals 32a each extend through the holding members 2, respectively, and inward in a radial direction of the circular arc portions 32b.

Also, at an end 32d of the second bus ring 32, a feeding terminal 32c, which is provided with a V phase driving current flowing in the second bus ring 32, is thermally caulked, and projected outward in a radial direction of the electrical collecting and distributing ring 3.

The third bus ring 33 is formed with a plurality of terminals 33a, which are arranged at a plurality of locations respectively in the circumferential direction of the third bus ring 33 so as to be connected to the end (first lead wire 113a) of the W phase winding 113, and a plurality of circular arc portions 33b, which connect the plurality of terminals 33a together in the circumferential direction of the third bus ring 33. In this embodiment, the terminals 33a each extend through the holding members 2, respectively, and inward in a radial direction of the circular arc portions 33b.

Also, at an end 33d of the third bus ring 33, a feeding terminal 33c, which is provided with a W phase driving current flowing in the third bus ring 33, is thermally caulked, and projected outward in a radial direction of the electrical collecting and distributing ring 3.

The neutral phase bus ring 30 is formed with a plurality of terminals 30a, which are arranged at a plurality of locations respectively in the circumferential direction of the neutral phase bus ring 30 so as to be connected to the respective second lead wires 111b, 112b and 113b of the U, V and W phase windings 111, 112 and 113, and a plurality of circular arc portions 30b, which connect the plurality of terminals 30a together in the circumferential direction of the neutral phase bus ring 30. In this embodiment, the terminals 30a each extend through the holding members 2, respectively, and outward in a radial direction of the circular arc portions 30b. That is, the respective terminals 31a, 32a and 33a of the first, second and third bus rings 31, 32 and 33 each extend inward in the respective radial directions of the circular arc portions 31b, 32b and 33b, respectively, and the terminals 30a of the neutral phase bus ring 30 each extend outward in the radial direction of the circular arc portions 30b.

As shown in FIG. 3, the first lead wire 111a of the U phase winding 111 is inserted in the terminal 31a of the first bus ring 31 extending through the holding member 2a and inward in the radial direction of the electrical collecting and distributing ring 3, while the second lead wire 113b of the W phase winding 113 is inserted in the terminal 30a of the neutral phase bus ring 30 extending through the holding member 2a and to the opposite side to the terminal 31a (outward in the radial direction of the electrical collecting and distributing ring 3).

The first lead wire 112a of the V phase winding 112 is inserted in the terminal 32a of the second bus ring 32 extending through the holding member 2b and inward in the radial direction of the electrical collecting and distributing ring 3, while the second lead wire 111b of the U phase winding 111 is inserted in the terminal 30a of the neutral phase bus ring 30 extending through the holding member 2b and to the opposite side to the terminal 32a (outward in the radial direction of the electrical collecting and distributing ring 3).

The first lead wire 113a of the W phase winding 113 is inserted in the terminal 33a of the third bus ring 33 extending through the holding member 2c and inward in the radial direction of the electrical collecting and distributing ring 3, while the second lead wire 112b of the V phase winding 112 is inserted in the terminal 30a of the neutral phase bus ring 30 extending through the holding member 2c and to the opposite side to the terminal 33a (outward in the radial direction of the electrical collecting and distributing ring 3).

Therefore, in the stator 11 comprising the windings having the respective first lead wires to be inserted in the terminals 31a, 32a and 33a respectively, the second lead wires of the windings arranged to the counterclockwise side (in FIG. 3, to the right side) relative to the first lead wires thereof respectively are inserted in the terminals 30a, respectively, of the neutral phase bus ring 30 corresponding to the terminals 31a, 32a and 33a of the first, second and third bus rings 31, 32 and 33, respectively.

The first, second and third bus rings 31, 32 and 33 are coated with an electrical insulator to be described below, whereas the neutral phase bus ring 30 is electrically uninsulated. The respective terminals 31a, 32a and 33a of the first, second and third bus rings 31, 32 and 33 are formed portions with the electrical insulator removed therefrom. Note that, of the first, second and third bus rings 31, 32 and 33 and the neutral phase bus ring 30, in order to ensure the electrical insulation therebetween, at least one of the two bus rings on top of each other in the axial direction thereof may be coated with the electrical insulator. That is, the two electrically uninsulated bus rings may not be on top of each other.

Because the first, second and third bus rings 31, 32 and 33 are identically formed, the first bus ring 31 is taken as an example, and described in more detail with reference to FIGS. 4 and 5.

(Configuration of the Terminal 31a of the First Bus Ring 31)

Figure 4A:
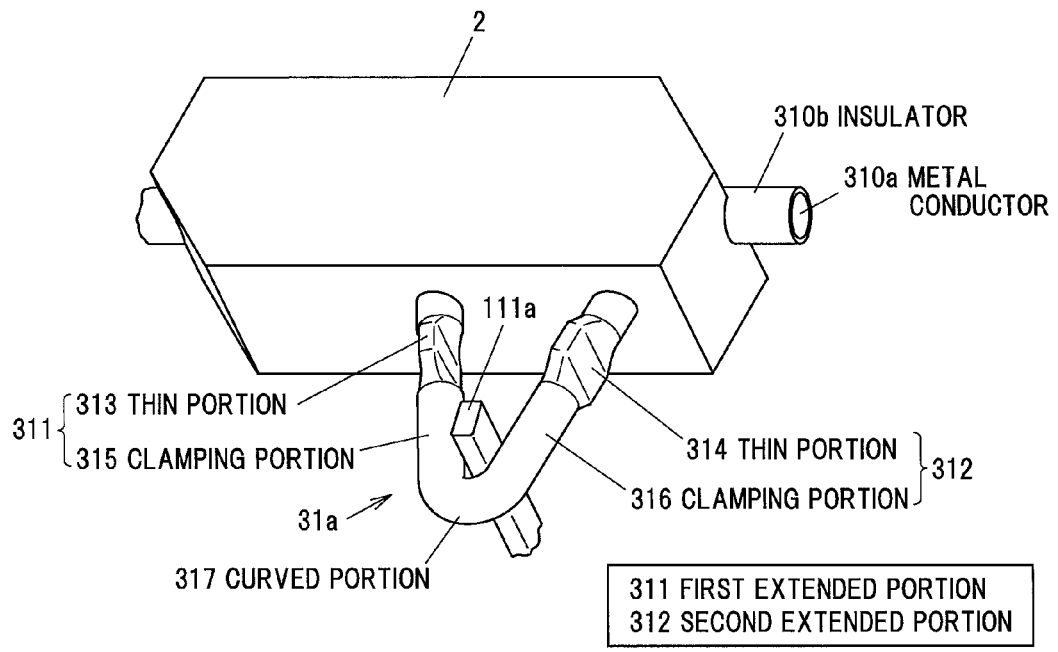
FIG. 4A is a perspective view showing a terminal of a first bus ring and its peripheral portion before being connected to a first lead wire of a winding.
Figure 4B:
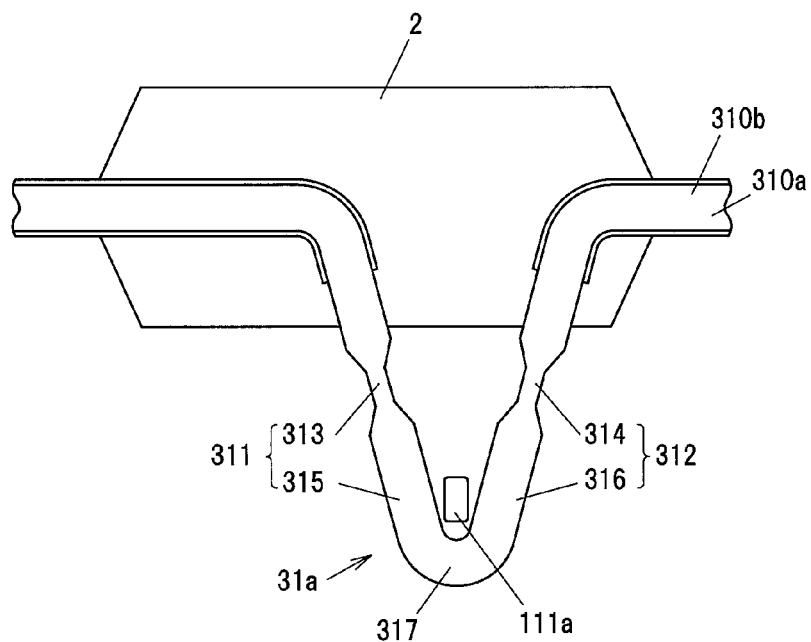
FIG. 4B is an explanatory view showing the terminal of the first bus ring and its peripheral portion viewed from above, before being connected to the first lead wire of the winding.
Figure 5A:
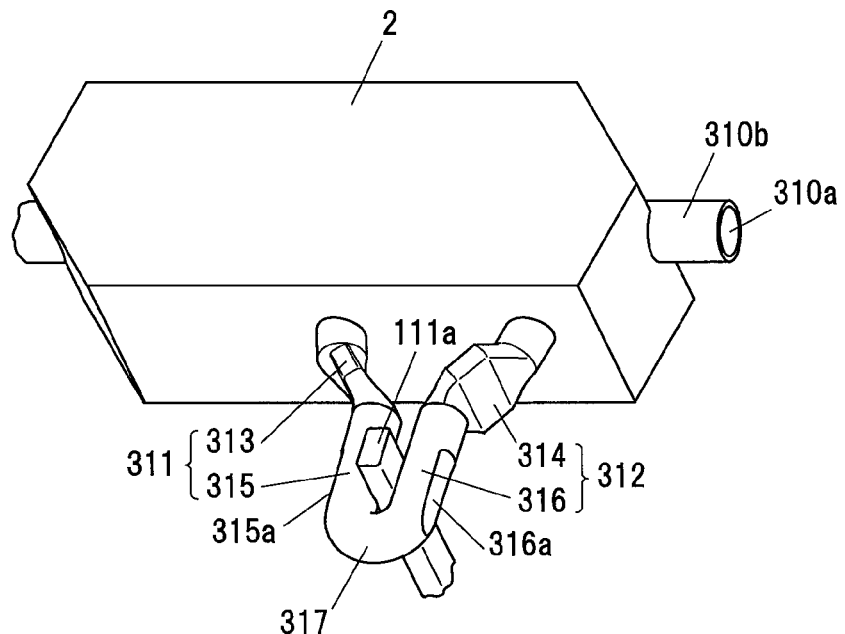
FIG. 5A is a perspective view showing the terminal of the first bus ring and its peripheral portion, when connected to the first lead wire of the winding.
Figure 5B:
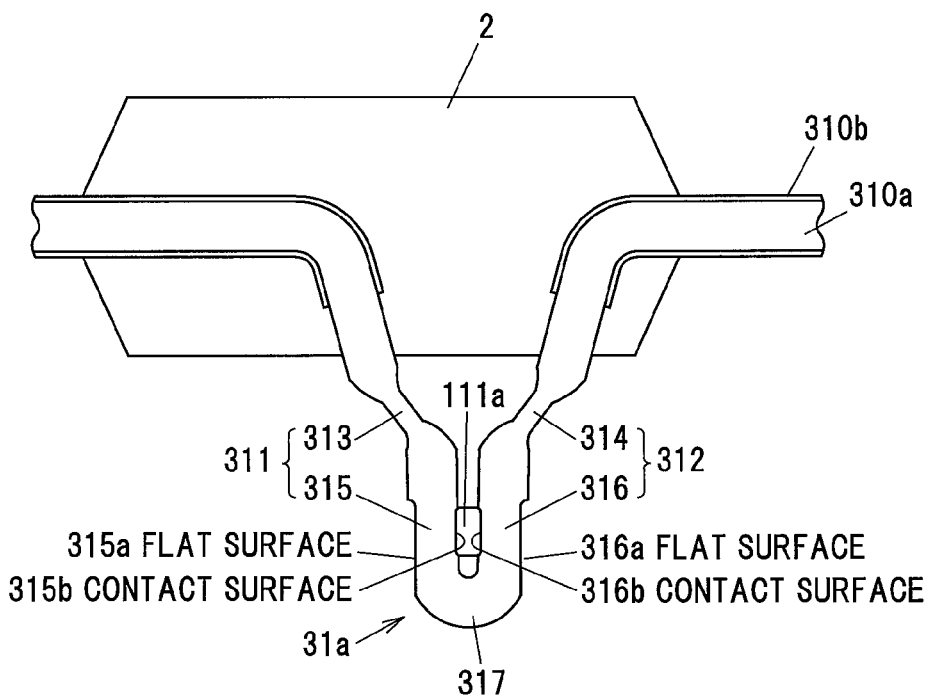
FIG. 5B is an explanatory view showing the terminal of the first bus ring and its peripheral portion viewed from above, when connected to the first lead wire of the winding.

FIG. 4A is a perspective view showing the terminal 31a of the first bus ring 31 and its peripheral portion before being connected to the first lead wire 111a of the U phase winding 111. FIG. 4B is an explanatory view showing the terminal 31a of the first bus ring 31 and its peripheral portion viewed from above, before being connected to the first lead wire 111a of the U phase winding 111. FIG. 5A is a perspective view showing the terminal 31a of the first bus ring 31 and its peripheral portion, when connected to the first lead wire 111a of the U phase winding 111. FIG. 5B is an explanatory view showing the terminal 31a of the first bus ring 31 and its peripheral portion viewed from above, when connected to the first lead wire 111a of the U phase winding 111.

The first bus ring 31 is formed of a linear electrical conducting member comprising a metal conductor 310a, which is made of a metal having a good electrical conductivity such as copper, and an electrical insulator 310b, which is made of a resin, and which coats the metal conductor 310a. The first bus ring 31 includes a plurality of terminals 31a and a plurality of circular arc portions 31b therebetween, respectively, (see FIG. 2B), formed by bending that metal conductor 310a. In this embodiment, the metal conductor 310a is round in cross section shape.

The terminal 31a includes one pair of extended portions (first extended portion 311 and second extended portion 312), which extend through the holding member 2 and inward in the radial direction of the circular arc portions 31b, and a curved portion 317, which is formed between the first extended portion 311 and the second extended portion 312.

The first extended portion 311 includes a clamping portion 315, which clamps the first lead wire 111a of the U phase winding 111, and a thin portion 313, which is formed thin in thickness in the circumferential direction of the circular arc portions 31b, at least partially between the holding member 2 and the clamping portion 315. Likewise, the second extended portion 312 includes a clamping portion 316, which clamps the first lead wire 111a of the U phase winding 111, and a thin portion 314, which is formed thin in thickness in the circumferential direction of the circular arc portions 31b, at least partially between the holding member 2 and the clamping portion 316.

The thin portion 313 of the first extended portion 311 and the thin portion 314 of the second extended portion 312 are each formed by flattening the metal conductor 310a in the circumferential direction of the circular arc portions 31b. Note that the thin portions 313 and 314 may be formed by grinding the metal conductor 310a.

The terminal 31a and the first lead wire 111a are connected together by applying pressure with one pair of electrodes (not shown) to the clamping portion 315 of the first extended portion 311 and the clamping portion 316 of the second extended portion 312 and bringing the clamping portions 315 and 316 into contact with the first lead wire 111a. In other words, the terminal 31a and the first lead wire 111a are connected together by caulking the clamping portions 315 and 316 with the first lead wire 111a clamped between the clamping portions 315 and 316. In this embodiment, the terminal 31a and the first lead wire 111a are connected together by heat caulking (fusing) welding the clamping portions 315 and 316 and the first lead wire 111a with Joule heat produced by electric current flowing in the one pair of electrodes.

With the one pair of electrodes, external pressure is applied to each of the clamping portions 315 and 316, resulting in flat surfaces 315a and 316a therein, as shown in FIGS. 5A and 5B. This applied pressure brings the first lead wire 111a into contact with each of the clamping portions 315 and 316. The clamping portion 315 of the first extended portion 311 is formed with a contact surface 315b, which is opposite the flat surface 315a so as to face the first lead wire 111a and come into surface contact with the first lead wire 111a. Likewise, the clamping portions 316 of the second extended portion 312 is formed with a contact surface 316b, which is opposite the flat surface 316a so as to face the first lead wire 111a and come into surface contact with the first lead wire 111a.

The first extended portion 311 is heated by electric current flowing in the one pair of electrodes, and its clamping portion 315 is melted and joined with the first lead wire 111a. Likewise, in the second extended portion 312, its clamping portion 316 is melted and joined with the first lead wire 111a. The first extended portion 311 and the second extended portion 312 are melted and joined with the first lead wire 111a so as to displace their respective clamping portions 315 and 316 close to each other and also displace their respective thin portions 313 and 314 close to each other. As a result, the first lead wire 111a and the terminal 31a are electrically connected together.

The terminal 32a of the second bus ring 32 and the terminal 33a of the third bus ring 33 are also configured in the same manner as the aforementioned terminal 31a of the first bus ring 31. Also, the terminal 30a of the neutral phase bus ring 30 is configured in the same manner as the terminals 31a, 32a and 33a of the first, second and third bus rings 31, 32 and 33.

Comparative Example

Figure 6A:
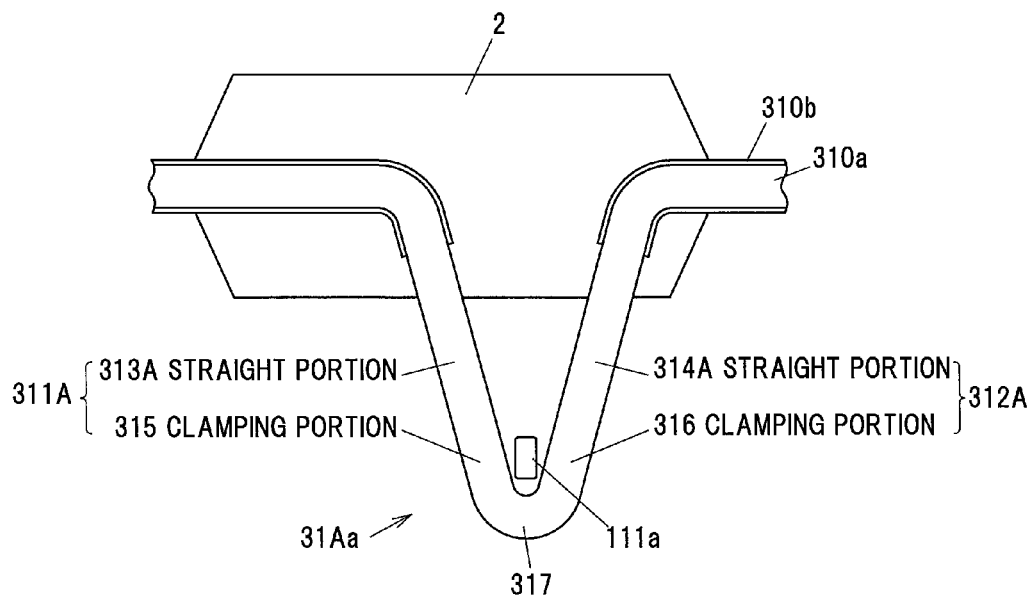
FIG. 6A is an explanatory view showing a first bus ring viewed from above, before being connected to the first lead wire of the winding, in an electrical collecting and distributing ring in a comparative example to the present invention.
Figure 6B:
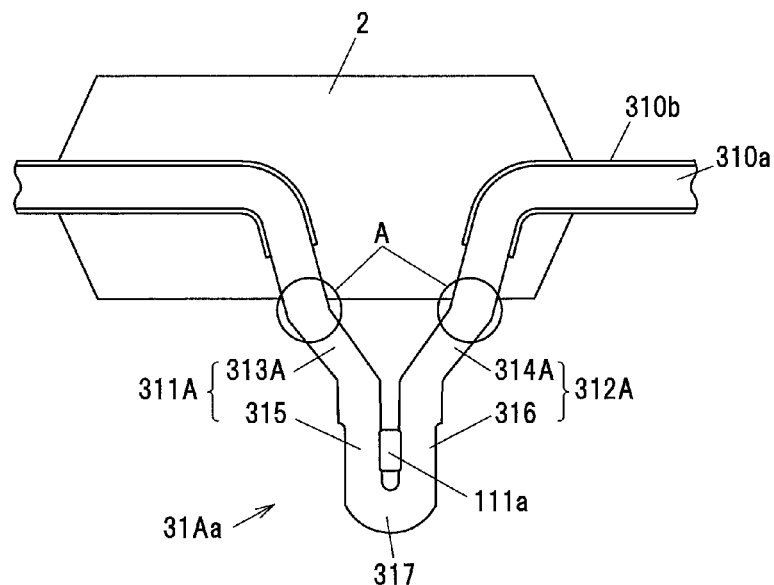
FIG. 6B is an explanatory view showing the first bus ring viewed from above, when connected to the first lead wire of the winding, in the electrical collecting and distributing ring in the comparative example to the present invention.

FIG. 6A is an explanatory view showing a first bus ring 31 viewed from above, before being connected to the first lead wire 111a of the U phase winding 111, in an electrical collecting and distributing ring 3 in a comparative example to the present invention, and FIG. 6B is an explanatory view showing the first bus ring 31 viewed from above, when connected to the first lead wire 111a of the U phase winding 111, in the electrical collecting and distributing ring 3 in the comparative example to the present invention.

A terminal 31Aa of the first bus ring 31 in this comparative example comprises a first extended portion 311A and a second extended portion 312A, which are different in shape from the first extended portion 311 and the second extended portion 312 of the terminal 31a in the embodiment. In FIGS. 6A and 6B, elements having substantially the same functions as those described for the first bus ring 31 in the embodiment are given common numerals or characters, and duplicated descriptions thereof are omitted.

The first extended portion 311A of the terminal 31Aa includes a clamping portion 315, which clamps the first lead wire 111a of the U phase winding 111, and a straight portion 313A, which extends between the holding member 2 and the clamping portion 315. Likewise, the second extended portion 312A includes a clamping portion 316, which clamps the first lead wire 111a of the U phase winding 111, and a straight portion 314A, which extends between the holding member 2 and the clamping portion 316.

No thin portions 313 and 314 are formed in the first extended portion 311A and the second extended portion 312A in this comparative example. That is, the first extended portion 311A and the second extended portion 312A have the same thickness in the circumferential direction of the first bus ring 31 as the diameter of the metal conductor 310a. Therefore, when the clamping portion 315 of the first extended portion 311A and the clamping portion 316 of the second extended portion 312A, and the first lead wire 111a of the U phase winding 111 are thermally caulked to displace the clamping portions 315 and 316 and thereby displace the straight portions 313A and 314A close to each other, tension resulting from the displacement thereof causes strong stress in portions (indicated by A in FIGS. 6A and 6B) which connect the straight portions 313A and 314A, respectively, and the holding member 2.

Functions and Advantageous Effects of the Embodiment

The above described embodiment has the following functions and advantageous effects.

(1) The respective one pair of extended portions 311 and 312 of the plurality of terminals 31a have the respective thin portions 313 and 314 formed thin in thickness in the circumferential direction of the circular arc portions 31b, at least partially between the holding members 2 and the respective clamping portions 315 and 316. Therefore, when the respective clamping portions 315 and 316 and the first lead wire 111a are thermally caulked to displace the respective clamping portions 315 and 316 close to each other, the respective thin portions 313 and 314 deform to receive the tension resulting from the displacement of the respective clamping portions 315 and 316, thereby allowing for mitigating (reducing) stress acting on the respective portions connecting the respective one pair of extended portions 311 and 312 and the holding member 2.

(2) The respective one pair of extended portions 311 and 312 are formed with the thin portions 313 and 314 respectively. Therefore, when the respective clamping portions 315 and 316 and the first lead wire 111a are thermally caulked, the one pair of extended portions 311 and 312 tend to be displaced, thereby allowing for reducing the pressure acting on the clamping portions 315 and 316. This allows for facilitating the heat caulking.

(3) The thin portions 313 and 314 are formed by flattening the metal conductor 310a in the circumferential direction of the circular arc portions 31b. Therefore, it is possible to form the thin portions 313 and 314 with the easy method, without depending on a complicated method by e.g. grinding the metal conductor 310a to form the thin portions 313 and 314.

Summary of the Embodiment

Next, the technical concept that is ascertained from the embodiment described above will be described with the aid of reference characters and the like in the embodiment. It should be noted, however, that each of the reference characters in the following description should not be construed as limiting the constituent elements in the claims to the members and the like specifically shown in the embodiment.

[1] An electrical collecting and distributing ring (3), comprising: an annular bus ring (first, second, third bus ring 31, 32, 33) to perform electrical collection and distribution to a polyphase winding (111, 112, 113) wound around a plurality of annularly arranged teeth (110), the bus ring (first, second, third bus ring 31, 32, 33) including a plurality of terminals (31a, 32a, 33a) and a plurality of circular arc portions (31b, 32b, 33b) therebetween, respectively, formed by bending a linear electrical conducting member (metal conductor 310a), so that the plurality of terminals (31a, 32a, 33a) are connected to ends, respectively, of the winding (111, 112, 113), while being connected together in a circumferential direction by the plurality of circular arc portions (31b, 32b, 33b) therebetween, respectively; and a holding member (2), which at least partially molds the bus ring (first, second, third bus ring 31, 32, 33), wherein the plurality of terminals (31a, 32a, 33a) include respective one pair of extended portions (311, 312) formed with clamping portions (315, 316), respectively, extending through the holding member (2) and in a radial direction of the circular arc portions (31b, 32b, 33b) to clamp the end therebetween of the winding (111, 112, 113), wherein the respective one pair of extended portions (311, 312) of the terminals (31a, 32a, 33a) include thin portions (313, 314), respectively, formed thin in thickness in the circumferential direction of the circular arc portions (31b, 32b, 33b), at least partially between the holding member (2) and the clamping portions (315, 316), respectively, wherein the terminals (31a, 32a, 33a) and the ends of the winding (111, 112, 113) are connected together by caulking the clamping portions (315, 316) with the ends of the winding (111, 112, 113) clamped between the clamping portions (315, 316), respectively.

[2] The electrical collecting and distributing ring according to [1] above, wherein the thin portions (313, 314) are formed by flattening the electrical conducting member (metal conductor 310a) in the circumferential direction of the circular arc portions (31b, 32b, 33b).

[3] The electrical collecting and distributing ring according to [1] above, wherein the respective one pair of extended portions (311, 312) of the terminals (31a, 32a, 33a) and the end therebetween of the winding (111, 112, 113) are connected together by heat caulking.

Although the embodiment of the present invention has been described above, the embodiment described above should not be construed to limit the invention in the appended claims. It should also be noted that not all the combinations of the features described in the above embodiment are essential to the means for solving the problems of the invention.

The present invention may be appropriately modified and practiced without departing from the spirit and scope thereof. For example, in the above embodiment the terminals 30a of the neutral phase bus ring 30 each extend outward in a radial direction of the circular arc portions 30b, but, instead, e.g. all the terminals of the neutral phase bus ring 30 and the first, second and third bus rings 31, 32 and 33 may each extend inward or outward in a radial direction of the circular arc portions.

Also, in the above described embodiment, the electrical insulators 310b are not exposed from the holding members 2 to the terminals 31a side, but, instead, e.g., the electrical insulators 310b may partially extend through the holding members 2 towards the first extended portions 311 and the second extended portions 312 of the terminals 31a, respectively.

Also, in the above described embodiment, the first, second and third bus rings 31, 32 and 33 are partially covered with the electrical insulator while the neutral phase bus ring 30 is the bare wire, but, instead, e.g. any one but not all of the first, second and third bus rings 31, 32 and 33 and the neutral phase bus ring 30 may be the bare wire.

Also, in the above described embodiment, the metal conductor 310a is round in cross section shape, but, instead, e.g., it may be flat.

Also, in the above described embodiment, the first, second and third bus rings 31, 32 and 33 and the neutral phase bus ring 30 are held by the plurality of holding members 2, but, instead, e.g. they may be held by a single holding member which molds the whole of the first, second and third bus rings 31, 32 and 33 and neutral phase bus ring 30.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electrical collecting and distributing ring, comprising:
   an annular bus ring for performing electrical collection and distribution to a polyphase winding wound around a plurality of annularly arranged teeth, the bus ring including a plurality of terminals and a plurality of circular arc portions therebetween, respectively, formed by bending a linear electrical conducting member, so that the plurality of terminals are exclusively formed from bent portions of the linear electrical conducting member and are connected to ends, respectively, of the winding, while being connected together in a circumferential direction exclusively by the plurality of circular arc portions therebetween, respectively; and
   a holding member, which at least partially molds the bus ring,
   wherein the plurality of terminals include respective one pair of extended portions formed with clamping portions, respectively, extending through the holding member and in a radial direction of the circular arc portions to clamp the end therebetween of the winding,
   wherein the respective one pair of extended portions of the terminals include thin portions, respectively, formed thin in thickness in the circumferential direction of the circular arc portions, at least partially between the holding member and the clamping portions, respectively,
   wherein the terminals and the ends of the winding are connected together by caulking the clamping portions with the ends of the winding clamped between the clamping portions, respectively, and
   wherein the holding member is made of a molded resin material.

2. The electrical collecting and distributing ring according to claim 1, wherein the thin portions are formed by flattening the electrical conducting member in the circumferential direction of the circular arc portions.

3. The electrical collecting and distributing ring according to claim 1, wherein the respective one pair of extended portions of the terminals and the end therebetween of the winding are connected together by heat caulking.

4. The electrical collecting and distributing ring according to claim 2, wherein the respective one pair of extended portions of the terminals and the end therebetween of the winding are connected together by heat caulking.

* * * * *